United States Patent

Stauffer

[15] 3,671,681

[45] June 20, 1972

[54] MAGNETOSTRICTIVE RECORDING ASSEMBLY

[72] Inventor: Norman L. Stauffer, Englewood, Colo.

[73] Assignee: Honeywell Inc., Minneapolis, Minn.

[22] Filed: Sept. 11, 1970

[21] Appl. No.: 71,575

[52] U.S. Cl. ....................179/100.2 CH
[51] Int. Cl. ....................G11b 5/30
[58] Field of Search ....................179/100.2 CH

[56] References Cited

UNITED STATES PATENTS

| | | | |
|---|---|---|---|
| 2,683,856 | 7/1954 | Kornei | 179/100.2 CH |
| 3,016,429 | 1/1962 | Johnson et al. | 179/100.2 CH |
| 3,053,941 | 9/1962 | Johnson | 179/100.2 CH |

*Primary Examiner*—Bernard Konick
*Assistant Examiner*—Robert S. Tupper
*Attorney*—Arthur H. Swanson, Lockwood D. Burton and Mitchell J. Halista

[57] ABSTRACT

A magnetic recording head assembly for recording input signals by selectively energizable recording heads on respective recording tracks on a recording member. The head assembly includes a plurality of recording heads with each of the recording heads having a frequency resonant structure including a magnetostrictive element accoustically coupled to a pair of pole pieces defining a recording gap and having a permanent magnet associated therewith for producing a magnetic flux through said gap. An input means including an electromagnet energized by an input signal source is arranged to apply a time varying electromagnetic field concurrently to the magnetostrictive element of each of the recording heads.

10 Claims, 2 Drawing Figures

*INVENTOR.*
NORMAN L. STAUFFER
BY Mitchell J. Halista
ATTORNEY.

MAGNETOSTRICTIVE RECORDING ASSEMBLY

BACKGROUND OF THE INVENTION

The recording of the components of data signals having variable repetition rates, i.e., amplitude or frequency modulated, has necessitated the need for providing a separate recording channel for each of the modulation frequencies of interest found in the composite input signal. Various schemes have been proposed in the prior art for separating the modulation frequency components from the composite signal and for recording the separated components to respective ones of a plurality of recording tracks on a recording medium. The prior art solution to this problem has usually taken the form of either a plurality of differing RC frequency resonant circuits arranged to be concurrently energized by the composite signal with each of the RC circuits being coupled to a respective one of a plurality of magnetic recording heads or a plurality of piezoelectric crystals arranged to be concurrently energized by the composite input signal with each of the crystals being responsive to a different frequency component of the composite signal and being coupled to a respective one of a plurality of conventional magnetic recording heads. Neither of these prior art solutions has provided a compact recording assembly due to the need for providing the separate structure for separating the frequency components from the composite input signal from that for recording the components.

Accordingly, it is an object of the present invention to provide a signal recording structure having an integral means for separating a frequency component from an applied composite input signal.

A further object of the present invention is to provide a magnetic recording structure for recording frequency components of a composite input signal on respective recording tracks of a recording medium using a frequency sensitive recording head having integral means for separating the frequency components from the composite input signal.

SUMMARY OF THE INVENTION

In accomplishing these and other objects, there has been provided, in accordance with the present invention, a magnetic recording assembly having a frequency resonant structure including a magnetostrictive element accoustically coupled to a recording flux path member having a stress variable magnetic flux permeability characteristic. The flux path member includes a pair of magnetostrictive pole pieces having a fixed magnetic flux source bridging the pole pieces to produce a magnetic flux across a recording gap defined by the pole pieces. An input signal means is arranged to apply a time varying electromagnetic field to the magnetostrictive element of the recording head.

BRIEF DESCRIPTION OF THE DRAWING

A better understanding of the present invention may be had when the following detailed description is read in connection with the accompanying drawings in which.

DESCRIPTION OF THE PREFERRED EMBODIMENT

Figure 1:
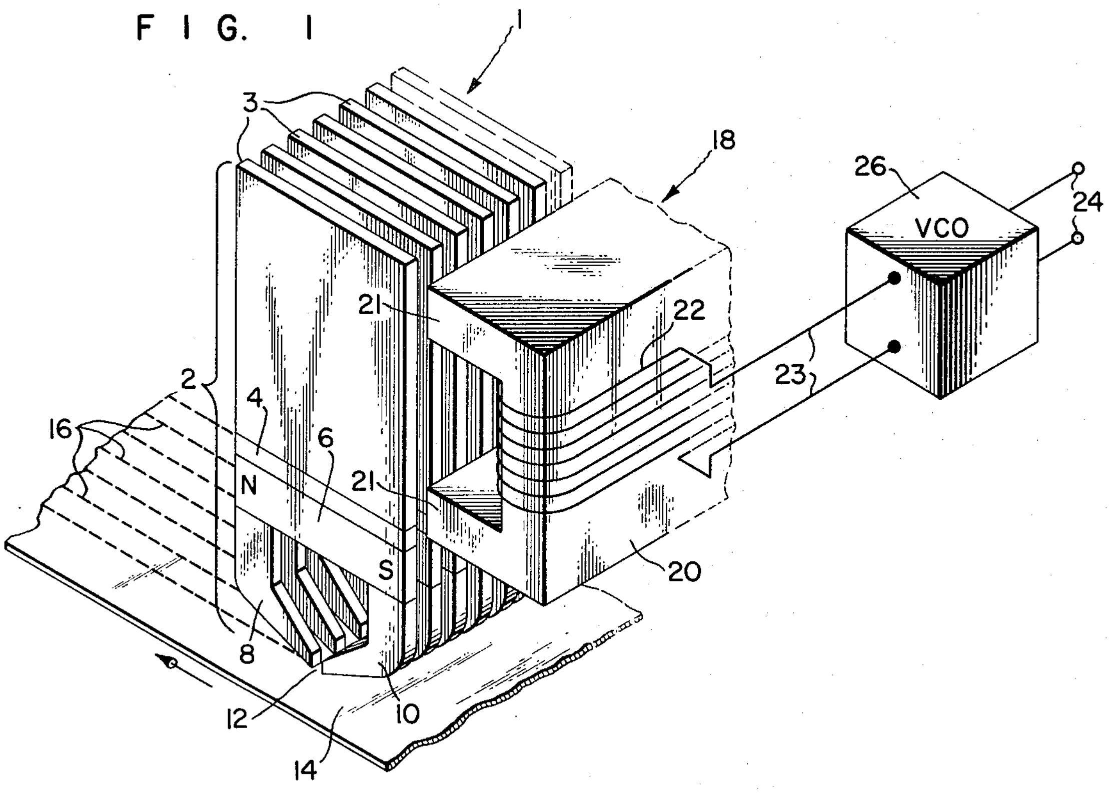
FIG. 1 is a pictorial diagram of a magnetic recording head assembly embodying the present invention.

In FIG. 1 there is shown a magnetic head assembly 1 including a plurality of recording heads 2. Each of the recording heads 2 includes an integral frequency resonant structure having a magnetostrictive member 3 attached to a non-magnetic accoustic signal coupling means 4 disposed across one end of the magnetostrictive member 3. A permanent magnet 6 is connected to the accoustic coupling means 4 on the opposite side thereof from the magnetostrictive element 3. The permanent magnet 4 is arranged to bridge a pair of pole pieces 8, 19 extending outwardly therefrom and having a recording gap 12 therebetween. A recording member 14, e.g., a magnetic tape or drum, is positioned adjacent to the recording gap 12 and is driven by any suitable means (not shown) to provide relative motion between recording heads 2 and the recording medium 14. The recording member 14 is arranged to have a plurality of recording tracks 16 with each of the recording tracks 16 being located for an operative association with a recording gap 12 of a respective one of the recording heads 2. An electromagnet means 18 is arranged to apply an electromagnetic field representative of an input signal to be recorded concurrently to the magnetostrictive means 3 of each of the magnetic heads 2. The electromagnetic means 18 includes a pole piece 20 having a U-shaped cross-section and having a pair of pole faces 21 with each pole face being located at a corresponding end of the "U." The pole faces 21 are elongated to extend across all of magnetostrictive members 3 of the head assembly 1 while being spaced therefrom. A coil 22 is wound on the pole piece 20 intermediate the pole faces 21 to produce a magnetic flux emanating from the pole faces 21 of the pole piece 20. A pair of output leads 23 from the coil 22 are provided for connecting the coil 22 to a source of an energizing signal. The coil 22 may be connected to the output of a voltage control oscillator, shown as VCO 26, with the output signal of the VCO 26 being applied to the winding 22 of the electromagnetic structure 18 to produce a time-varying electromagnetic field representative of the frequency of variation of that output signal. The input of the VCO 26 is, in turn, connected via a pair of input terminals 24 to a source (not shown) of a variable amplitude input signal to be recorded on the recording medium 14.

The magnetostrictive element 3 of each of the magnetic heads 2 is energized by the magnetic flux from the electromagnet assembly 18 and is composed of any suitable conventional magnetostrictive material, e.g., nickel or nickel compound. Similarly, the pole pieces 8 and 10 are, also, composed of a similar conventional magnetostrictive material. The acoustic coupling element 4 may be any suitable non-magnetic material in the form of a deposited thick film or foil capable of coupling acoustic waves generated by the flexing of magnetostrictive member 3 while exhibiting a high magnetic reluctance to the magnetic flux from either the electromagnet 18 or the permanent magnet 4. Suitable materials for the element 4 would be non-magnetic stainless steel, aluminum or brass.

Each of the magnetic recording heads 2 including the magnetostrictive element 3, the acoustic coupler 4, the permanent magnet 6 and the pole pieces 8 and 10 are arranged to form a predetermined frequency resonant structure. In other words, a structure which is particularly responsive to the magnetic flux from the electromagnetic means 18 when the flux is varied at a frequency corresponding to the resonant frequency of the structure. This variation of the magnetic flux is, of course, achieved by a variation in the energizing signal applied to the coil 22. The resonance of the magnetic head structure at the resonant frequency is effective to apply periodic stresses to the pole pieces 8 and 10 through the acoustic coupler 4 in synchronism with the frequency of the stresses induced in the magnetostrictive element 3 by the electromagnetic structure 18. Thus, while the flux from the electromagnetic structure 18 is directed primarily to inducing stresses in the element 3, the acoustic coupling by the coupler 4 allows the entire structure of the head to determine the resonant frequency and to transmit stress waves to the pole pieces 8 and 10.

Figure 2:
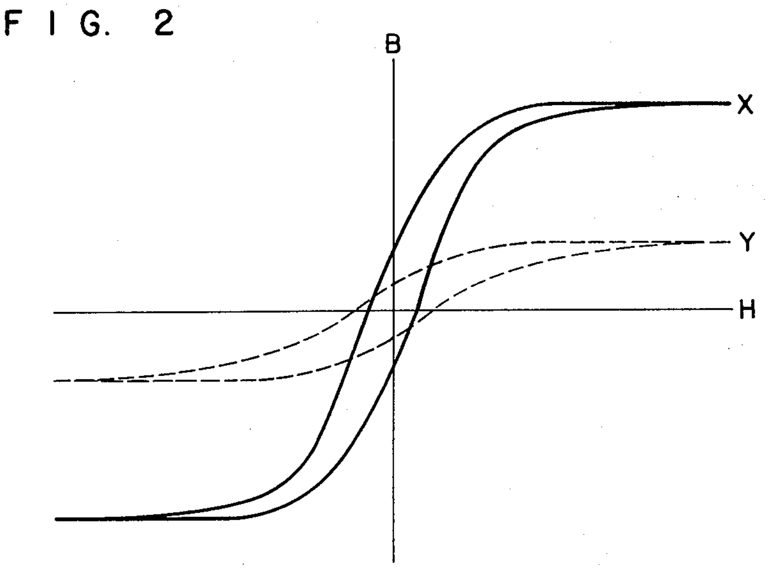
FIG. 2 is a waveshape diagram of the operation of an individual head of the magnetic head assembly shown in FIG. 1.

In FIG. 2, there is shown a wave shape of the effect of an applied stress on the pole pieces 8 and 10 in terms of the magnetic permeability of the pole pieces 8, 10 to the magnetic flux produced by the permanent magnet 6. The curve labeled "X" is a representation of the normal B-H curve of the pole pieces 8 and 10 with respect to the magnetic permeability thereof, while the curve labeled "Y" is a representation of the effective B-H curve when the pole pieces 8 and 10 are exposed to a physical stress, e.g., the stress wave induced by the electromagnetic member 18 by means of the magnetostrictive element 3. In other words, the magnetic reluctance of the pole pieces 8 and 10 is lowest when the curve "X" is governing, i.e., at a time of low stress, and is highest when the curve "Y" is in effect, i.e., during a high stress period. The switching of the pole pieces 8 and 10 between a high and low reluctance state is, accordingly, achieved by the application of the periodic stresses resulting from the resonance of the magnetic head structure to the characterized magnetic field from the electromagnetic field producing means 18.

Since the characterized magnetic field from the electromagnet means 18 is representative of the composite input signal applied to the input terminals 24 which, in turn, in the embodiment shown in FIG. 1 produces a variable output signal from the VCO 26, the signal recorded by one of the recording heads 2 corresponds to a modulating frequency component of the composite input signal which component produced a resonance of that recording head. Thus, by predetermining the frequency resonant characteristic of each of the recording heads of the recording head assembly to a different respective frequency component of the composite input signal, the assembly 18 can be used to produce recording signals in respective ones of the recording track 16 corresponding to respective frequency components of the composite input signal. This selective adaptation of each of recording heads 2 of the magnetic head structure 18 to a predetermined resonant condition can be most easily effected by a change in the physical dimensions of the corresponding magnetostrictive element 3 which change is effective to alter the resonant frequency of the overall recording head structure. Since the electromagnetic field of the field producing means 18 is applied concurrently to the magnetostrictive element of each of the recording heads 2, it may be seen that the separately resonant recording heads are effective to separate their respective frequency components from the composite input signal and to produce respective recording traces of the frequency components on the recording medium 14.

Thus, there has been provided, in accordance with the present invention, a magnetic recording assembly having an integral means for separating the frequency components of a composite input signal applied to the recording assembly and for recording the presence of these frequency components on respective recording tracks of a magnetic recording medium.

The embodiments of the invention in which an exclusive property or privilege is claimed are defined as follows:

1. A magnetic recording head comprising a frequency resonant assembly including a magnetostrictive element accoustically coupled to a flux path member having a stress-variable permeability characteristic, said flux path member including a recording gap and a magnetic field producing means arranged to produce a magnetic flux across said recording gap and input means arranged to apply a time-varying electromagnetic field representative of an input signal to said magnetostrictive element.

2. A magnetic recording head as set forth in claim 1 wherein said flux path member includes a pair of magnetostrictive pole pieces having said recording gap therebetween.

3. A magnetic recording head as set forth in claim 2 wherein said flux path member includes a permanent magnet means bridging said pair of pole pieces to produce a magnetic flux across said recording gap.

4. A magnetic recording head as set forth in claim 1 wherein said input means includes an electromagnet arranged to apply a magnetic field representative of an input signal to said magnetostrictive element.

5. A magnetic recording assembly for recording input signals on respective recording tracks on a recording member comprising a plurality of recording heads, each of said heads including a frequency resonant structure responsive to a predetermined respective frequency range and having a magnetostrictive element accoustically coupled to a flux path member including a recording gap and magnetic field producing means arranged to produce a magnetic field across said gap and having a stress-variable permeability characteristic and an input signal means arranged to apply a time varying electromagnetic field concurrently to said magnetostrictive element of each of said recording heads.

6. A magnetic recording assembly as set forth in claim 5 wherein said flux path member of each of said heads includes a pair of magnetostrictive pole pieces having said recording gap therebetween.

7. A magnetic recording assembly as set forth in claim 6 wherein said flux path member includes a permanent magnet means bridging said pair of pole pieces to produce a magnetic flux across said recording gap.

8. A magnetic recording assembly as set forth in claim 5 wherein said input signal signal means includes an electromagnet arranged to apply a magnetic field representative of an input signal concurrently to said magnetostrictive element of each of said recording heads.

9. A magnetic recording assembly as set forth in claim 5 wherein said predetermined frequency range for each of said recording heads is different from any other frequency range of a recording head in said recording assembly.

10. A magnetic recording assembly as set forth in claim 5 and including a nonmagnetic means for accoustically coupling said frequency resonant structure to said flux path member.

* * * * *